(12) United States Patent
Jahr et al.

(10) Patent No.: US 10,889,019 B2
(45) Date of Patent: Jan. 12, 2021

(54) AUTOMATIC SIM PUNCH AND METHOD

(71) Applicant: Giesecke+Devrient Mobile Security America, Inc., Dulles, VA (US)

(72) Inventors: Christoph Jahr, Ashburn, VA (US); Douglas Tallamy, Leesburg, VA (US)

(73) Assignee: GIESECKE+DEVRIENT MOBILE SECURITY AMERICA, INC., Dulles, VA (US)

( * ) Notice: Subject to any disclaimer, the term of this patent is extended or adjusted under 35 U.S.C. 154(b) by 161 days.

(21) Appl. No.: 16/234,994

(22) Filed: Dec. 28, 2018

(65) Prior Publication Data

US 2019/0134838 A1 May 9, 2019

Related U.S. Application Data

(63) Continuation-in-part of application No. PCT/US2017/037939, filed on Jun. 16, 2017, and a
(Continued)

(51) Int. Cl.
*G06K 19/077* (2006.01)
*B26D 5/00* (2006.01)
(Continued)

(52) U.S. Cl.
CPC .............. *B26D 5/007* (2013.01); *B26D 7/01* (2013.01); *B26D 7/28* (2013.01); *B26F 1/44* (2013.01);
(Continued)

(58) Field of Classification Search
CPC .......... G06K 19/063; G06K 19/07737; G06K 19/07739; B26D 5/00; B26D 5/007;
(Continued)

(56) References Cited

U.S. PATENT DOCUMENTS 5,531,145 A 7/1996 Haghiri-Tehrani
7,350,705 B1 4/2008 Frederick et al.
(Continued)

FOREIGN PATENT DOCUMENTS

EP 2590112 A2 5/2013
KR 1020160022328 A1 2/2016
(Continued)

OTHER PUBLICATIONS

International Bureau of WIPO, International Preliminary Report on Patentability for International Patent Application No. PCT/US2017/037939, dated Jan. 10, 2019.
(Continued)

*Primary Examiner* — Thien M Le
*Assistant Examiner* — April A Taylor
(74) *Attorney, Agent, or Firm* — Faegre Drinker Biddle & Reath LLP

(57) ABSTRACT

A data carrier with detachable parts, a method of forming a data carrier comprising a primary card body, a data carrier puncher for removing detachable parts of data carriers, and a method of removing a form changing part from a data carrier using a puncher are disclosed. The data carrier with detachable parts comprising: a primary card body having a first size; a form changing part disposed within the primary card body and having a second size, the form changing part connected to the primary card body by at least one fixing portion, and the form changing part configured to be removed from the primary card body by breaking the at least one fixing portion; an integrated circuit component embedded in the form changing part; and at least one notch disposed at a first position on a first end of the primary card body.

21 Claims, 10 Drawing Sheets

Related U.S. Application Data continuation-in-part of application No. PCT/US2017/037948, filed on Jun. 16, 2017.

(60) Provisional application No. 62/356,446, filed on Jun. 29, 2016.

(51) Int. Cl.
| | | |
|---|---|---|
| *B26D 7/01* | (2006.01) | |
| *B26F 1/44* | (2006.01) | |
| *H04B 1/3816* | (2015.01) | |
| *B26D 7/28* | (2006.01) | |
| *G06K 19/063* | (2006.01) | |
| *B26D 7/00* | (2006.01) | |

(52) U.S. Cl.
CPC ..... *G06K 19/063* (2013.01); *G06K 19/07737* (2013.01); *G06K 19/07739* (2013.01); *H04B 1/3816* (2013.01); *B26D 2007/0018* (2013.01)

(58) Field of Classification Search
CPC .................. B26D 7/00; B26D 7/0006; B26D 2007/0012; B26D 2007/0018; B26F 1/38; B26F 1/44

See application file for complete search history.

(56) References Cited

U.S. PATENT DOCUMENTS

| | | | | |
|---|---|---|---|---|
| 9,712,201 B2* | 7/2017 | Vagelos | ............... | H04B 1/3818 |
| 2007/0125866 A1 | 6/2007 | Nishizawa et al. | | |
| 2011/0000752 A1 | 1/2011 | Jandl et al. | | |
| 2013/0116010 A1 | 5/2013 | Lepp et al. | | |
| 2013/0175346 A1* | 7/2013 | Jenni | .................... | G06K 19/077 |
| | | | | 235/492 |
| 2015/0286920 A1 | 10/2015 | Filpi et al. | | |
| 2017/0203460 A1* | 7/2017 | Tarantino | ......... | G06K 19/07722 |

FOREIGN PATENT DOCUMENTS

| | | |
|---|---|---|
| WO | 2013007376 A1 | 1/2013 |
| WO | 2015036965 A1 | 3/2015 |

OTHER PUBLICATIONS

International Bureau of WIPO, International Preliminary Report on Patentability for International Patent Application No. PCT/US2017/037948, dated Jan. 10, 2019.

Korean Intellectual Property Office, International Search Report and Written Opinion of the International Searching Authority in International Patent Application No. PCT/US2017/037939, dated Sep. 22, 2017.

Korean Intellectual Property Office, International Search Report and Written Opinion of the International Searching Authority in International Patent Application No. PCT/US2017/037948, dated Sep. 11, 2017.

* cited by examiner

AUTOMATIC SIM PUNCH AND METHOD

CROSS-REFERENCE TO RELATED APPLICATIONS

The present application claims the benefit of priority to U.S. Provisional Application No. 62/356,446, entitled "AUTOMATIC SIM PUNCH AND METHOD," and filed on Jun. 29, 2016, and subsequent International Patent Application Nos. PCT/US2017/037939 and PCT/US2017/037948, the disclosures of which are incorporated herein by reference in their entirety.

TECHNICAL FIELD

Embodiments of the present disclosure relate generally to a data carrier, such as a subscriber identity module ("SIM") card, having at least two mechanically separable parts comprising (1) a first part capable of functioning as a primary card body and a data carrying part and (2) a second part functional as a form factor changing part and the data carrying part. Additionally, embodiments of the present disclosure relate to a puncher that is capable of mechanically separating the at least two mechanically separable parts.

INTRODUCTION

Electronic devices, including wireless connected devices, have gained widespread use and may provide a variety of functions including, for example, telephonic, electronic messaging, data transfer, and/or applications. Portable electronic devices may include, for example, cellular telephones, smart telephones, tablet computers, wireless personal digital assistants ("PDAs"), and/or laptop computers.

These electronic devices may include a Universal Integrated Circuit Card ("UICC") to identify a subscriber for network access. For example, the UICC may be used as a Subscriber Identity Module ("SIM") card in a portable electronic device, such as a mobile device. A SIM card may facilitate communication with a communication network via a subscription for the designated voice or data subscription of the electronic device. SIM cards include information and provide identity documentation, authentication, and other information regarding a user of the electronic device via an embedded integrated circuit component. The integrated circuit component securely stores an international mobile subscriber identity ("IMSI") with a key that is used to identify and authenticate subscribers on connected mobile devices, such as cell phones, tablets, and computers. Various other types of information may also be stored on the SIM card, such as an address book, text messages, network names, or other carrier or subscriber information. This information may also be read from the SIM card and be made available to the wireless device.

While a SIM card may include of a carrier having at least two mechanically separable parts comprising a first part having the embedded integrated circuit component and a second part functional as a form factor changing part, the current approach to separate the at least two parts needs a user to manually remove the first part from the second part in order to correctly identify the second part being removed. For example, wireless service providers may rely on electronic device manufacturers and/or third-party distributors to insert the SIM card into the electronic devices. As a result, the burden of inserting SIM cards has moved from electronic device users who individually inserted the SIM card into their electronic device to a bulk process. This bulk process may be cumbersome, may be time consuming, may result in improper separation and damaged SIM cards, and may require ordering many different SIM card types and form factors from a plurality of SIM card manufacturers.

Thus, there exists a need to provide a SIM card and a SIM card puncher that allows the mechanical separation of the SIM card parts, but also achieves a high processing speed with the correct removal of parts.

SUMMARY OF THE DISCLOSURE

According to certain embodiments, a Subscriber Identity Module ("SIM") card, a card puncher, and methods thereof are disclosed.

According to certain embodiments, a data carrier with detachable parts is disclosed. One data carrier with detachable parts comprising: a primary card body having a first size, the primary card body including a first end and a second end along a particular direction, a first side and a second side along a further direction, and a front surface and a back surface that is opposite the front surface; a form changing part disposed within the primary card body and having a second size, the form changing part connected to the primary card body by at least one fixing portion, and the form changing part configured to be removed from the primary card body by breaking the at least one fixing portion; an integrated circuit component embedded in the form changing part within the primary card body; and at least one notch disposed at a first position on the first end of the primary card body, the first position being off-center from a central axis of the primary card body extending in the further direction.

According to certain embodiments, a method of forming a data carrier comprising a primary card body is disclosed. One method comprising: providing a primary card body comprising a first end and a second end along a particular direction, a first side and a second side along a further direction, and a front surface and a back surface that is opposite the front surface; forming a form changing part configured to be removed from the primary card body, the form changing part remaining partially connected to the primary card body; embedding an integrated circuit component in one of the first surface or second surface of the form changing part of the primary card body; and forming a first notch at a first position on the first end of the primary card body, the first position being off-center from a central axis of the primary card body extending in the further direction.

According to certain embodiments, a data carrier puncher for removing detachable parts of data carriers is disclosed. One data carrier puncher comprising: a punch housing that receives a data carrier with at least one detachable part, the punch housing including: a form changing part aperture that corresponds to a size of a particular detachable part configured to be removed from the data carrier, the form changing part aperture configured to permit the particular detachable part to pass therethrough; and one or more projections be disposed off-center from a central axis of the punch housing, the one or more projections corresponding to one or more notches on an edge of a primary card body of the data carrier; a switch disposed adjacent to the one or more projections, the switch, when activated, causing removal of the detachable part from the data carrier; and a punch operably connected to the switch, when activated by the switch, the punch breaking at least one fixing portion connecting the detachable part to the data carrier in response to activation of the switch, wherein the one or more projections are configured to permit the data carrier to engage the switch to prevent improper activation of the switch and damage to an integrated circuit component of the at least one detachable part.

According to certain embodiments, a method of removing a form changing part from a data carrier using a puncher is disclosed. One method comprising: receiving a data carrier at one or more guide openings of a punch housing, the data carrier including: a primary card body having a first size, the primary card body including a first end and a second end along a particular direction, a first side and a second side along a further direction, and a front surface and a back surface that is opposite the front surface; a form changing part disposed within the primary card body and having a second size, the form changing part connected to the primary card body by at least one fixing portion, and the form changing part configured to be removed from the primary card body by breaking the at least one fixing portion; an integrated circuit component embedded in the form changing part within the primary card body; and at least one notch disposed at a first position on the first end of the primary card body, the first position being off-center from a central axis of the primary card body extending in the further direction; guiding the primary card body of the data carrier to align the at least one notch to corresponding one or more projections of the punch housing by one or more guides; engaging, when the one or more projections of the punch housing align with a corresponding at least one notch, the end of the primary card body with a switch disposed adjacent to the punch housing; and punching, when the primary card body engages the switch, the form changing part from the primary card body using a puncher to break the at least one fixing portion.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Figure 1:
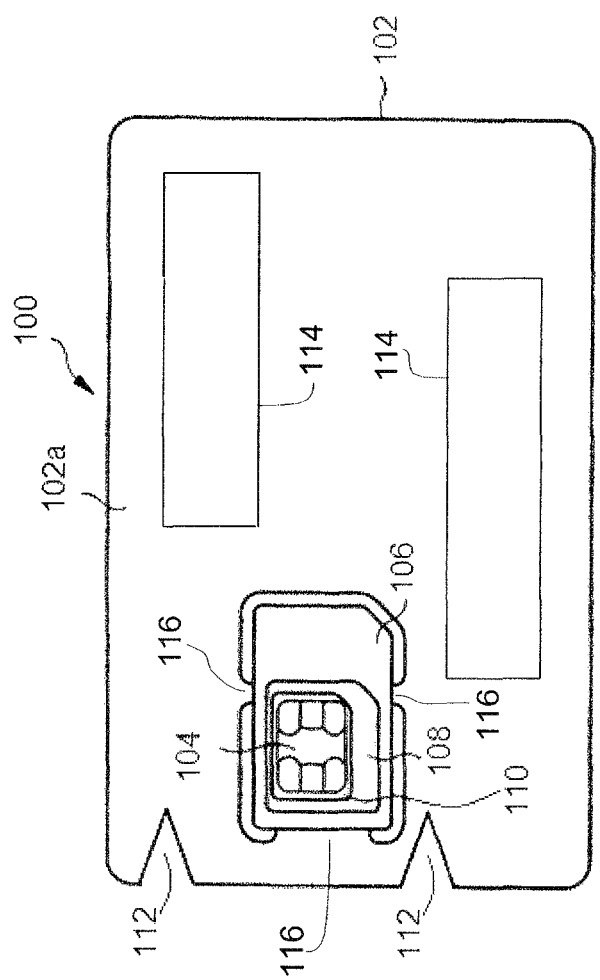
FIG. 1 depicts a UICC and/or SIM card that may include a primary card body having a first dimensional profile and an integrated circuit component having a plurality of electrical contacts, according to embodiments of the present disclosure.

There are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

For the sake of brevity, conventional techniques related to computers used to conduct methods and other functional aspects of the present disclosure may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure generally relates to, among other things, a Universal Integrated Circuit Card ("UICC")(also referred herein as a Subscriber Identity Module ("SIM")

card) that includes at least two mechanically separable parts comprising a first part capable of functioning as a global data carrier and a second part functional as a form factor changing part. The first part may include an integrated circuit and/or a microprocessor and a plurality of electrical contacts to enable communication between the microprocessor and a host device (e.g., a computer, a mobile device, a non-mobile device, a terminal, a remote terminal, etc.). The host device may employ an input device (e.g., a card reader) to accept the body and complete a circuit with the electrical contacts to enable communication (e.g., transfer data) between the UICC and the host device.

The input device and/or card reader may be configured to support a layout or pattern of the electrical contacts positioned on the UICC. Physical characteristics or parameters of UICCs may be governed by certain international standards provided by, for example, the European Telecommunications Standards Institute (ETSI) and the International Standard Organization (ISO). In particular, physical characteristics or parameters of an UICC are provided by certain form factor standards (e.g., ID-1, plug-in UICC, a mini-UICC) defined by International Standard Organization ISO/IEC 7816-2 and 7816-3 and/or Technical Specification of the European Telecommunications Standards Institute ETSI TS 102 221. For example, ISO/IEC 7816-2 and/or ETSI TS 102 221 standards may define an overall profile and/or dimensional profile of conforming UICCs. For example, some current standards define an ID-1 card standard (or $1^{st}$ form factor ("1FF") or full-size SIM), plug-in UICC (or $2^{nd}$ form factor ("2FF") or mini-SIM) standard, a micro-UICC (or $3^{rd}$ form factor ("3FF") or micro-SIM) standard, and a nano-UICC (or 4th form factor ("4FF") or nano-SIM) standard. Each of the different form factors defines a different dimensional envelope or profile. More specifically, the ID-1 card standard provides a first dimensional profile that is larger than dimensional profiles of the mini-SIM, micro-SIM, and the nano-SIM, the mini-SIM standard provides a dimensional profile that is larger than the dimensional profiles of the micro-SIM and nano-SIM, and the micro-SIM standard provides a dimensional profile that is larger than the dimensional profile of the nano-SIM.

An order and/or an arrangement of the electrical contacts on the UICC and/or SIM card may also be defined by standards. Standards may define a layout of electrical contacts on the UICC and/or SIM card as a grid pattern that provides a surface area of around one (1) centimeter squared. UICCs and/or SIM cards may have a common electrical contact pattern and/or configuration for different form factors, and may be differentiated by the shape and/or profile of the card body supporting and/or surrounding the electrical contact pattern.

Host devices and/or card readers (not shown) may be configured and/or adapted to receive a dedicated UICC form factor standard (e.g., conforming to only one standard). Sizes of host devices and/or card readers may be impacted by the size of the form factor standard, which may significantly increase a dimensional envelope of a portable electronic device. In some example electronic devices, a host device and/or card reader may cover the greatest amount of surface area of an electronic board of an electronic device (e.g., a mobile phone) compared to other electronic components of the electronic device. For example, by having a standardized size and dimension of electrical contacts for integrated circuit components, an integrated circuit chip, and/or a microprocessor of the UICC and/or SIM card, a host device must have a minimum surface area specified by the standard to properly couple to the electrical contacts.

Smaller electronic devices, however, are generally desirable for portability. As a result, current standards may not be sufficient to reduce the size and/or an overall footprint of a mobile device. While the present disclosure relates to UICCs and/or SIM cards that follow certain standards, a person of ordinary skill in the art may modify and/or deviate from the dimensional envelope and/or profiles (e.g., shape and/or dimensions) provided by the standards and practice the inventive concepts of the present disclosure.

Additionally or alternatively, the example UICCs and/or SIM cards described herein may employ a contact pad that includes a plurality of electrical contact patterns. The plurality of contact patterns may be positioned or oriented on the contact pad such that one or more of the electric contacts define a plurality of different electrical contact patterns (e.g., multiple different electrical contact patterns) to enable an example UICC and/or SIM card disclosed herein to communicate and/or be read by a plurality of different host devices and/or card readers.

According to embodiments of the present disclosure, a UICC and/or a SIM card may include a plastic card and/or other materials with an integrated circuit component, an integrated circuit chip, and/or a microprocessor and a plurality of electrical contacts to enable communication between the integrated circuit component, the integrated circuit chip, and/or the microprocessor and the host device. The UICC and/or SIM card may conform to one or more of the various standards characterizing the size of the card. Further, the UICC and/or SIM card may include a plurality of dimensional profiles including, but not limited to, the 4FF, 3FF, 2FF, and 1FF dimensional profiles.

FIG. 1 depicts a UICC and/or SIM card 100 may include a primary card body 102 having a first dimensional profile and/or a first size, such as 1FF, and an integrated circuit component 104 having a plurality of electrical contacts, according to embodiments of the present disclosure. The primary card body 102 may include a front surface 102a and a back surface 102b (See, FIGS. 4A and 4B). The primary card body 102 may include one or more of form factor changing parts 106, 108, and 110 corresponding to a particular form factor (e.g., 2FF, 3FF, and 4FF). The form changing part may be connected to the primary card body 102 by one or more fixing portions 116. The primary card body 102 and the one or more fixing potions 116 may be made of a flexible material so that the one or more of form factor changing parts 106, 108, and 110 may be easily bendable from a plane of primary card body 102 for removal and insertion into an electronic communications device. While embodiments of the present disclosure discuss a primary card body including three form factor changing parts 106, 108, and 110, a person of ordinary skill in the art may recognize that only one form changing part may be used. Additionally, and/or alternatively, a person of ordinary skill in the art may recognize that two or more form changing parts may be used.

In embodiments of the present disclosure, a mini form changing part 106 may be detachable and/or separable from the primary card body 102 and may have a second dimensional profile and/or a second size, such as 2FF, that is smaller than the first dimensional profile. Upon being separated from the primary card body 102, the mini form changing part 106 may include the integrated circuit component 104. A micro form changing part 108 may detachable and/or separable from the mini form changing part 106 and the primary card body 102 and may have a third dimensional profile and/or a third size, such as 3FF, that is smaller than the first dimensional profile and the second dimensional profile. Upon being separated from the primary card body 102 and the mini form changing part 106, the micro form changing part 108 may include the integrated circuit component 104. A nano form changing part 110 may detachable and/or separable from the micro form changing part 108, the mini form changing part 106, and the primary card body 102 and may have a fourth dimensional profile and/or a fourth size, such as 4FF, that is smaller than the first dimensional profile, the second dimensional profile, and the third dimensional profile. Upon being separated from the primary card body 102, the mini form changing part 106, and the micro form changing part 108, the nano form changing part 110 may include the integrated circuit component 104.

Figure 2:
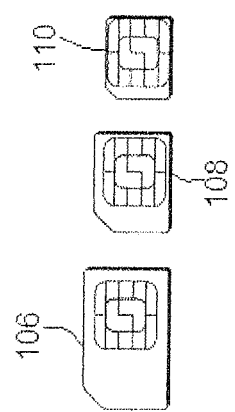
FIG. 2 depicts the mini, micro, and nano form changing parts having a respective integrated circuit component when separated from the primary card body, according to embodiments of the present disclosure.

As mentioned above, the first dimensional profile of the primary card body 102 maybe of type 1FF, which may be defined by ISO 7816 standard and may be a same size as a credit card (ID-1 format: 85.60 mm×53.98 mm×0.76 mm). FIG. 2 depicts the various form changing parts having the integrated circuit component, according to embodiments of the present disclosure. The form changing parts 106, 108, and 110 may be separated or detached from the primary card body 102 by providing cutouts and/or breakaway tabs that correspond to the smaller sized dimensional profiles. Thus, the primary card body 102 may have a length of 85.60 mm, a width of 53.98 mm, and a thickness of 0.76 mm. The mini form changing part 106 may have a reduced length and width which corresponds to 2FF sizes, such as length 25 mm, width 15 mm; thickness 0.76 mm. The micro form changing part 108 may have a reduced length and width which corresponds to 3FF sizes, such as length 15 mm, width 12 mm; thickness 0.76 mm. The nano form changing part 110 may have a reduced length and width which corresponds to 4FF sizes, such as length 12.3 mm, width 8.8 mm; thickness 0.76 mm.

FIG. 2 depicts the mini, micro, and nano form changing parts having a respective integrated circuit component when separated from the primary card body, according to embodiments of the present disclosure. When a form changing part 106, 108, and/or 110 of the primary card body 102 is separated and/or detached, the detached form changing part may be consistent with a form factor since the length, the width, and the thickness at a periphery of a respective form changing part corresponds to specifications of the form factor. The detached form changing part may then be introduced into a receiving host device and/or card reader, such as a smart phone.

Referring back to FIG. 1, the UICC and/or SIM card 100 may also include one or more notches 112 on the primary card body 102. The one or more notches may be disposed on an edge of the primary card body 102. The one or more notches 112 may also be disposed off-center from a central axis of the edge that extends through a length of the primary card body and/or disposed off of a midpoint of the first edge. While the one or more notches are shown to be triangular in shape in the drawings, a person of ordinary skill in the art may use other shapes for the notches, such as squares, rectangles, half-circles, concave shapes, and/or other shapes in which a corresponding projection 212 (FIG. 3) may be inserted, as discussed in detail below. Alternatively, and/or additionally, the primary card body 102 may have projections corresponding to a "notch" into which such projections may be inserted.

The primary card body 102 may be provided with one or more notches so that the UICC and/or SIM card 100 may be properly aligned in a card puncher for punching a form changing part 106, 108, and/or 110 from the primary card body 102, and/or reading of information that may be printed information sections 114 on the front surface 102a and/or the back surface 102b. As discussed below, when the UICC and/or SIM card 100 is properly aligned, the edge of the primary card body 102 may contact a switch that may activate a punch, which removes a form changing part 106, 108, and/or 110 from the primary card body 102.

When the UICC and/or SIM card 100 is properly aligned, a reliable mechanism is provided for removing and/or punching out the form changing part 106, 108, and/or 110 from the primary card body 102, which may then be placed into an electronic communication device for service. As mentioned above, multitudes of electronic communication devices are sold annually, and the cards and devices described in the present disclosure provide for time savings by reliably automating at least a part of the process of removing and/or punching out the form changing part 106, 108, and/or 110 from the primary card body 102 and inserting the form changing part 106, 108, and/or 110 in the electronic communication device. Any automation of the process of removal/punching UICC and/or SIM card 100 must also be accurate and reliable so that the UICC and/or SIM card 100 and corresponding electrical contacts are not damaged in the removal/punching process.

Figure 3:
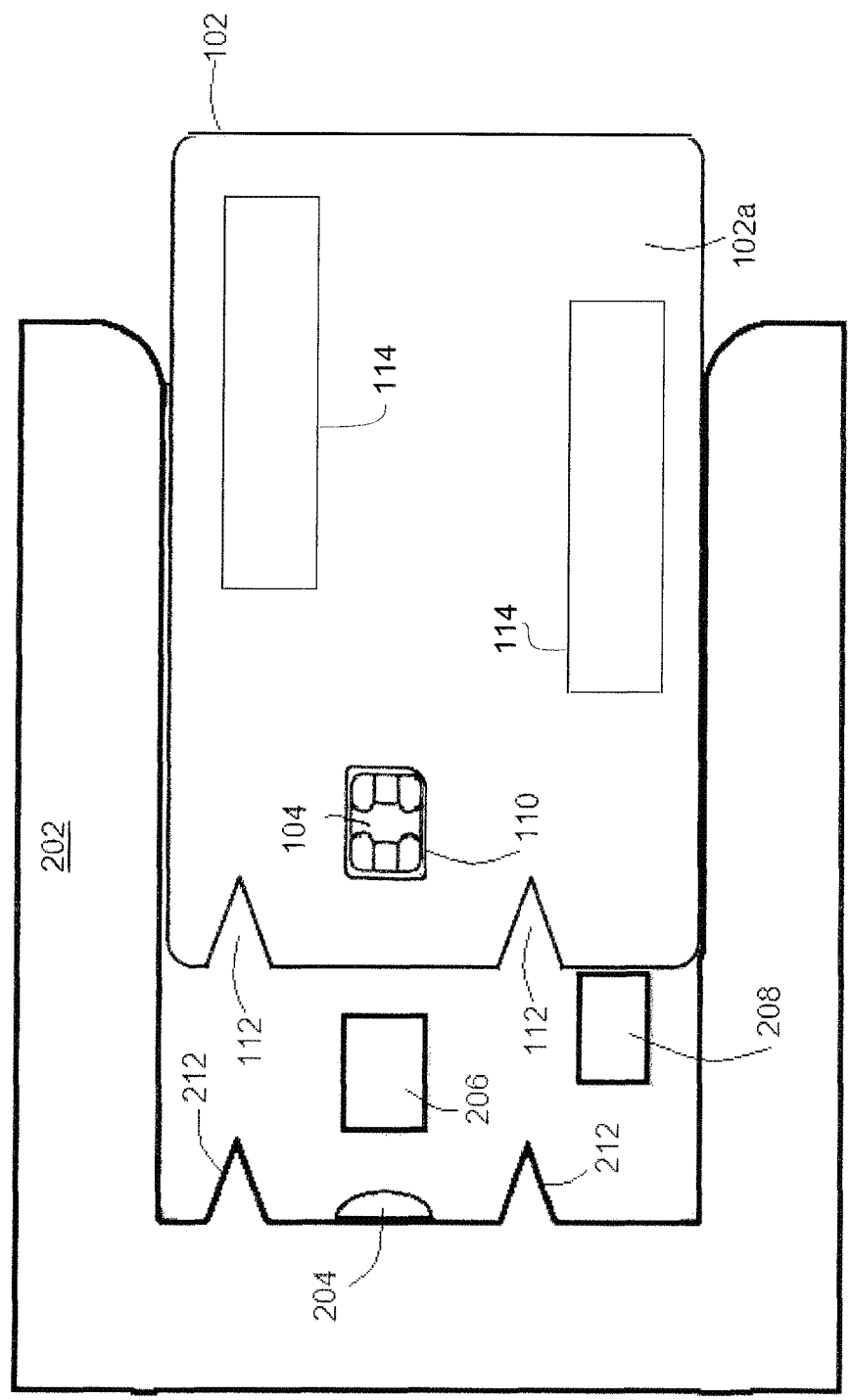
FIG. 3 depicts an UICC and/or SIM card having the integrated circuit component at least partially inserted in a punch housing, according to embodiments of the present disclosure.

FIG. 3 depicts an UICC and/or SIM card 100 having the integrated circuit component 104 at least partially inserted in a punch housing 202, according to embodiments of the present disclosure. The UICC and/or SIM card 100 may be inserted into the punch housing 202 that includes a form changing part aperture 206 that corresponds to the dimensional profile of a particular form changing part 106, 108, A punch template 210 (FIG. 5) of the punch housing 202 may be exchanged, and each punch template 210 may have a corresponding form changing part aperture 206 that has a size and/or shape that corresponds to the form changing part 106, 108, and/or 110 to be punched/removed from the primary card body 102.

In embodiments of the present disclosure, the form changing part aperture 206 may be the same size (a 3FF size) for a form changing part 108 (a 3FF size) and a form changing part 108 (a 4FF size) to be punched/removed from the primary card body 102. For example, a form changing part aperture 206 with a 3FF size is large enough for both a form changing part 108 (a 3FF size) and a form changing part 108 (a 4FF size) to be punched/removed from the primary card body 102.

The punch housing 202 may also include a second aperture 208 that allows an image reader, bar code reader, camera, etc. to read a bar code and/or other information, such as a serial number, on printed information sections 114 of the UICC and/or SIM card 100 (i.e., data carrier) carrying the integrated circuit component 104, the bar code and/or other information (serial number) including information about the integrated circuit component 104. Obtaining this information may be used for tracking purposes related to the integrated circuit component 104 of the UICC and/or SIM card 100. As mentioned above, the UICC and/or SIM card 100 may be provided with one or more notches that 112, which may align with projections 212 in the punch housing 202. When the UICC and/or SIM card 100 is properly aligned for punching and reading for information, a leading edge of the UICC and/or SIM card 100 may contact a switch 204 that may activate a punch that removes a corresponding form changing part 106, 108, and/or 110 with the integrated circuit component 104 from the primary card body 102.

A variety of arrangements may be used to achieve alignment of the UICC and/or SIM card 100 with the punch housing 202. In embodiments of the present disclosure, it is preferable that the alignment of the UICC and/or SIM card 100 with the punch housing 202 allow for the UICC and/or SIM card 100 to be inserted into the punch housing 202 in one way that permits the activation of the switch 204. As mentioned above, the one or more notches 112 of the UICC and/or SIM card 100 are not symmetrical and/or not aligned across an axis of the UICC and/or SIM card 100 so the UICC and/or SIM card 100 may not be flipped over and inserted in a way such that the integrated circuit component 104 of the UICC and/or SIM card 100 may not be properly aligned for punching or the bar code and/or other information may not be read. Using an asymmetrical arrangement for the one or more notches 112, the UICC and/or SIM card 100 may not be inserted into the punch housing 202 the wrong way to activate the switch 204.

Figure 4A:
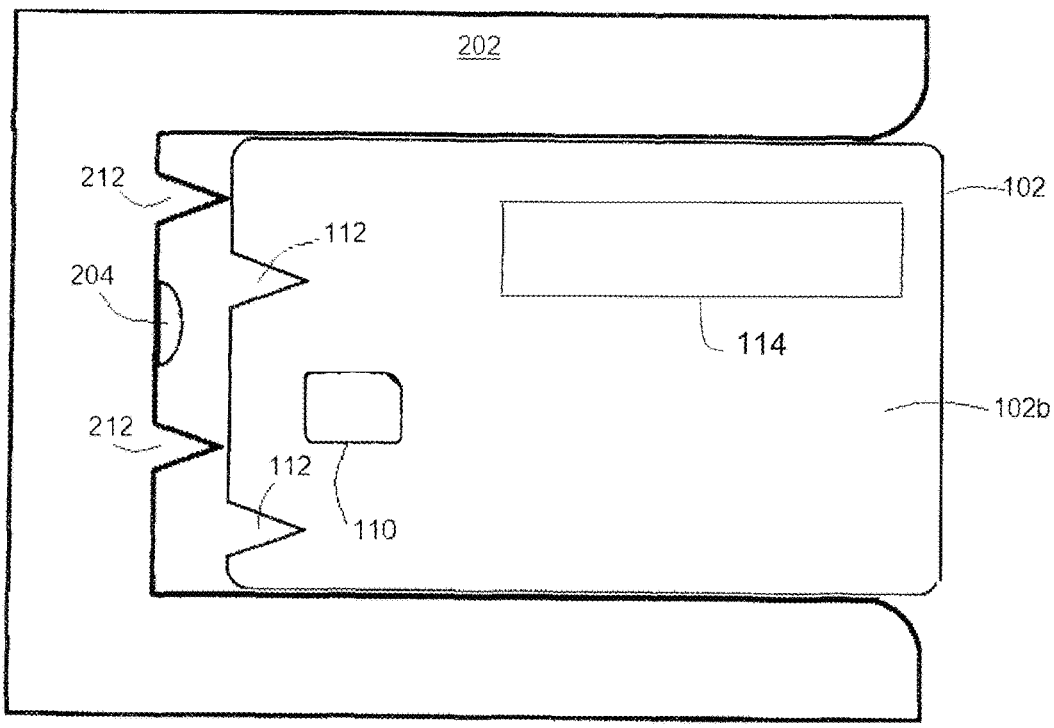
FIGS. 4A and 4B depict a UICC and/or SIM card inserted a wrong way into the punch housing, according to embodiments of the present disclosure.
Figure 4B:
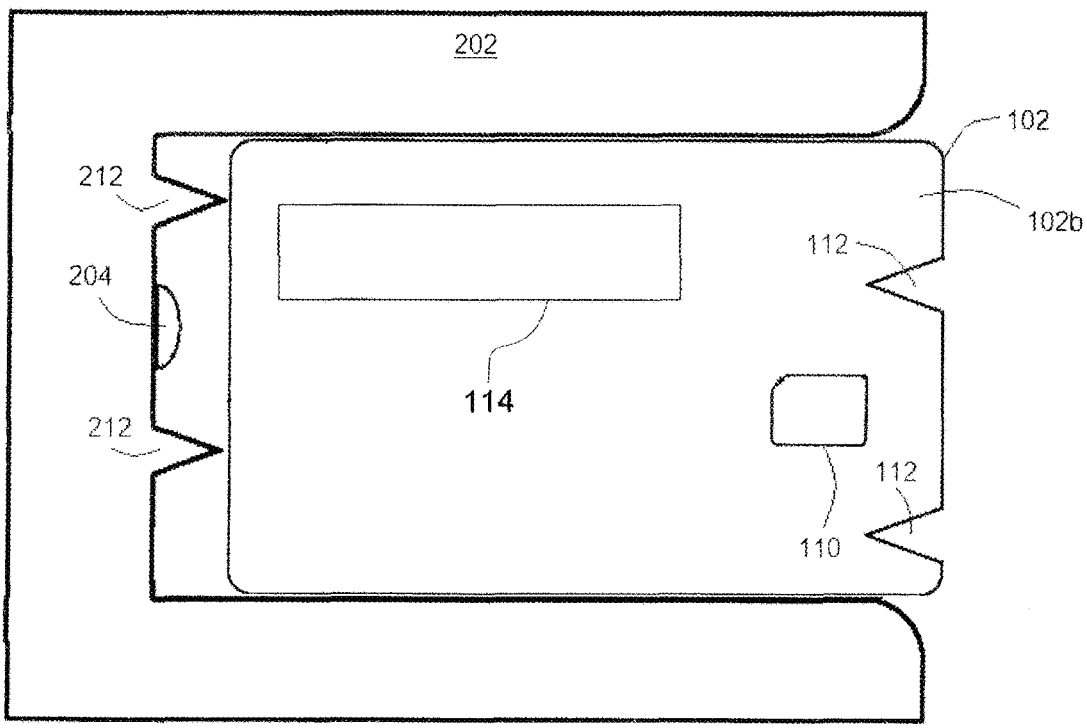

FIGS. 4A and 4B depict a UICC and/or SIM card inserted a wrong way into the punch housing, according to embodiments of the present disclosure. The alignment mechanism may ensure that a UICC and/or SIM card 100 inserted the wrong way will not activate the punch switch. In the exemplary embodiments of FIGS. 4A and 4B, the projections 212 in the punch housing 202 may provide sufficient clearance (as illustrated) to prevent erroneous activation of a punch activated by switch 204, which may damage the integrated circuit component 104, the UICC and/or SIM card 100, and/or even the punch itself. Additionally, the projections 212 in the punch housing 202 may provide sufficient clearance that prevents erroneous reading of a bar code or serial number of the printed information sections 114 on the UICC and/or SIM card 100. In particular, FIG. 4A depicts the UICC and/or SIM card 100 inserted in the punch housing 202 upside down with the notches 112 on a leading edge of the primary card body 102, and FIG. 4B depicts the UICC and/or SIM card 100 inserted in the punch housing 202 upside down with the notches 112 outside of the punch housing 202.

Figure 5:
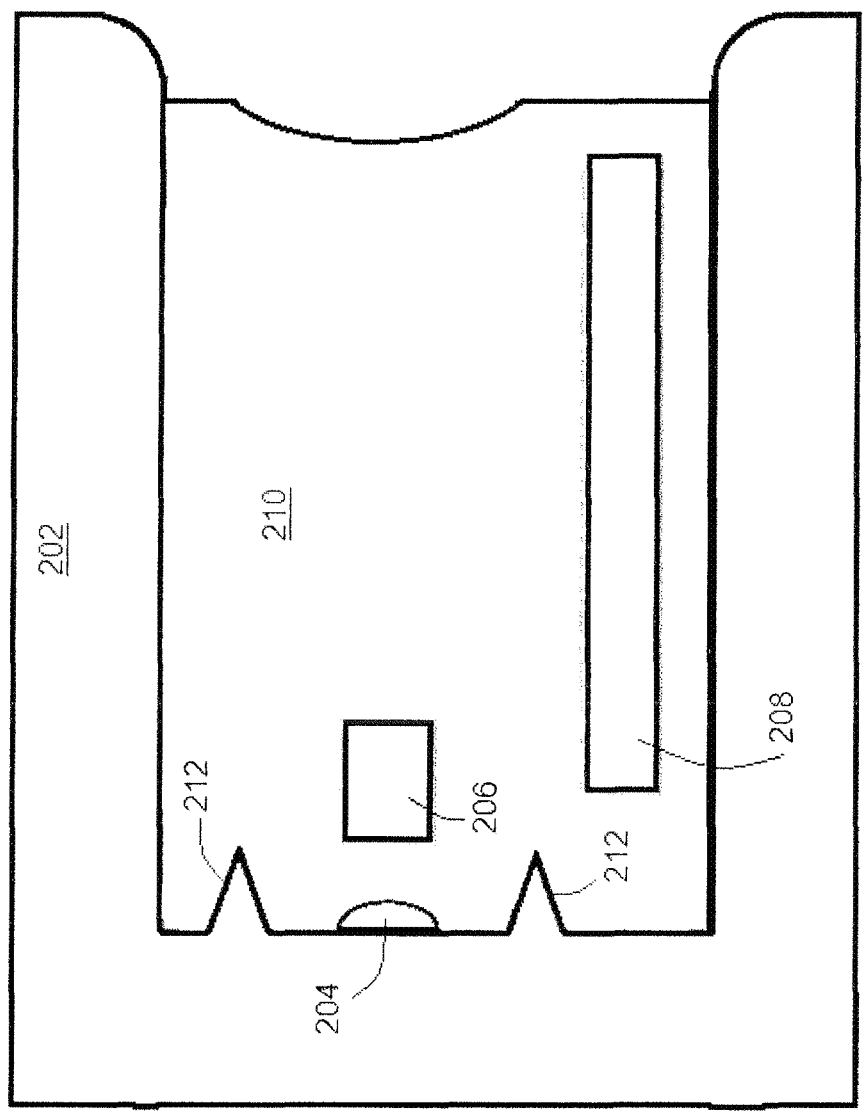
FIG. 5 depicts a more detailed view of features of the punch housing 202, according to embodiments of the present disclosure.

FIG. 5 depicts a more detailed view of features of the punch housing 202, according to embodiments of the present disclosure. A UICC and/or SIM card 100 may be inserted into the punch housing 202 that includes a form changing part aperture 206 that corresponds to the dimensional profile of a particular form changing part 106, 108, and/or 110 (e.g., 2FF, 3FF, 4FF) to be punched and/or removed from the UICC and/or SIM card 100. In the embodiment shown in FIG. 5, a punch template 210 of the punch housing 202 may have a form changing part aperture 206 that corresponds to a form changing part 110 of a UICC and/or SIM card 100. The form changing part aperture 206 may have a dimensional profile that corresponds to nano-UICC (or $4^{th}$ form factor ("4FF") or nano-SIM) standard, which allows a form changing part 110 to be punched and/or removed from a UICC and/or SIM card 100. The punch template 210 may be exchanged for another punch template that has a form changing part aperture that corresponds to a size and/or shape of a particular form changing part, such as form changing part 106 and/or 108 to be punched/removed from the primary card body 102. In addition, or alternately, the punch template 210 may include an adjustable portion that adjusts the position and/or size of the form changing part aperture 206 so that multiple form factors (e.g., 2FF, 3FF, and/or 4FF) may be punched/removed from the primary card body 102 with a single punch template 210.

The punch housing 202 may also include a second aperture 208 that allows an image reader, bar code reader, camera, etc. to read a bar code and/or other information, such as a serial number, on printed information sections 114 of the UICC and/or SIM card 100 (i.e., data carrier) carrying the integrated circuit component 104, the bar code and/or other information (serial number) including information about the integrated circuit component 104.

The punch housing 202 may include one or more projections 212. The one or more projections may correspond to the one or more notches 112 on the primary card body 102. The one or more projections 212 may be disposed adjacent to a switch 204 of the punch housing 202. The one or more projections 212 may also be disposed off-center from a central axis of the punch housing 202 and/or may be asymmetrical. While the one or more, projections are shown to be triangular in shape in the drawings, a person of ordinary skill in the art may use other shapes for the projections, such as squares, rectangles, half-circles, concave shapes, and/or other shapes in which a corresponding notch 112 (FIG. 3) of a UICC and/or SIM card 100 may be inserted. As noted above, the projection may alternatively, or additionally, be provided on primary card body 102 and the notches may be provided in punch housing 102.

The one or more projections 212 of the punch housing 202 may align with the one or more notches 112 of a UICC and/or SIM card 100. When the UICC and/or SIM card 100 is properly aligned for punching and reading for information, a leading edge of the UICC and/or SIM card 100 may contact the switch 204 that may activate a punch that removes a corresponding form changing part 106, 108, and/or 110 with the integrated circuit component 104 from the primary card body 102.

A variety of arrangements may be used to achieve alignment of the UICC and/or SIM card 100 with the punch housing 202. In embodiments of the present disclosure, it is preferable that the alignment of the UICC and/or SIM card 100 with the punch housing 202 allow for the UICC and/or SIM card 100 to be inserted into the punch housing 202 in one way that permits the activation of the switch 204. As mentioned above, the one or more notches 112 of the UICC and/or SIM card 100 are not symmetrical and/or not aligned across an axis of the UICC and/or SIM card 100 so the UICC and/or SIM card 100 may not be flipped over and inserted in a way such that the integrated circuit component 104 of the UICC and/or SIM card 100 may not be properly aligned for punching or the bar code and/or other information of the printed information sections 114 may not be read. Using an asymmetrical arrangement for the one or more notches 112, the UICC and/or SIM card 100 may not be inserted into the punch housing 202 the wrong way to activate the switch 204.

Figure 6:
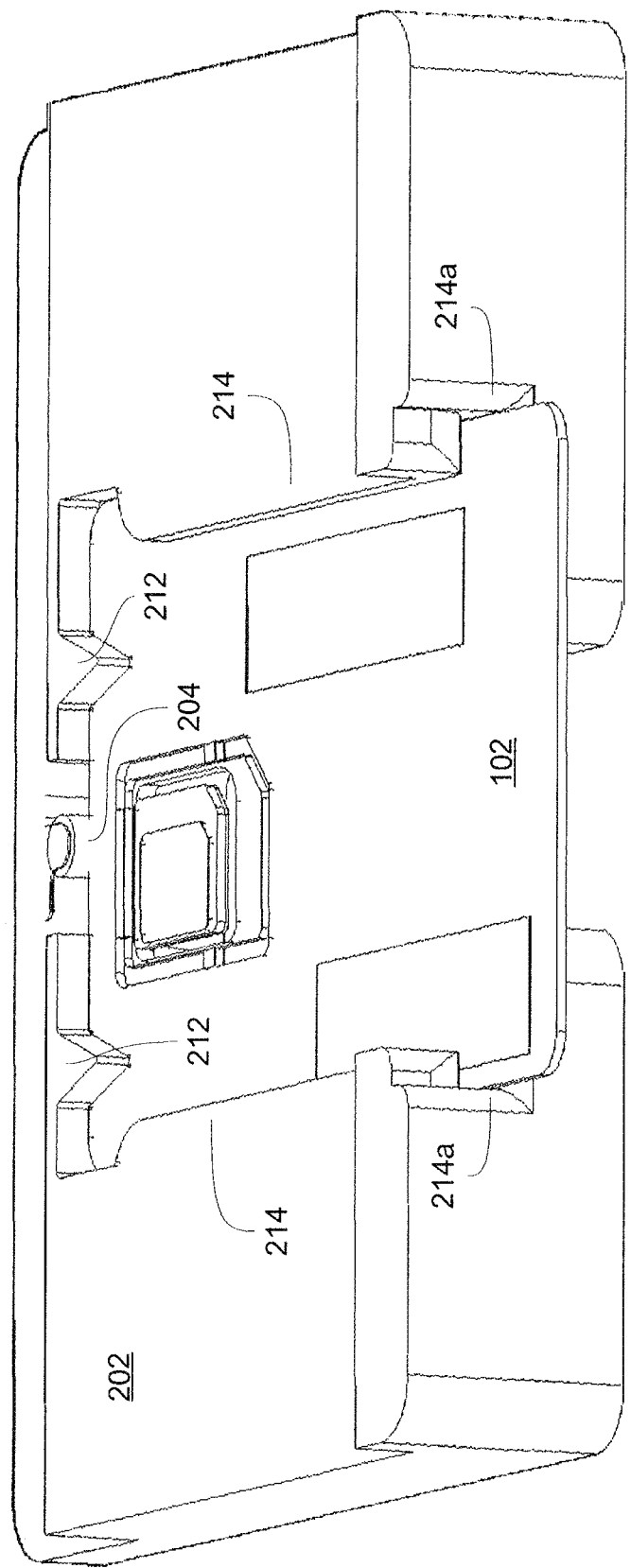
FIG. 6 depicts a perspective view of features of the punch housing 202, according to embodiments of the present disclosure.

FIG. 6 depicts a perspective view of features of the punch housing 202, according to embodiments of the present disclosure. As shown in FIG. 6, the punch housing 202 may include one or more guides 214. Each of the one or more guides 214 may have a respective guide opening 214a that allows for and/or assist in the insertion of the primary card body 102 of the UICC and/or SIM card 100 into the punch housing 202. The one or more guides 214 may also assist in the holding of the primary card body 102 of the UICC and/or SIM card 100 when the form changing part is punched and/or removed from the primary card body 102. The one or more guide openings 214a may be curved and/or angular to assist in the insertion of the primary card body 102 of the UICC and/or SIM card 100.

Figure 7:
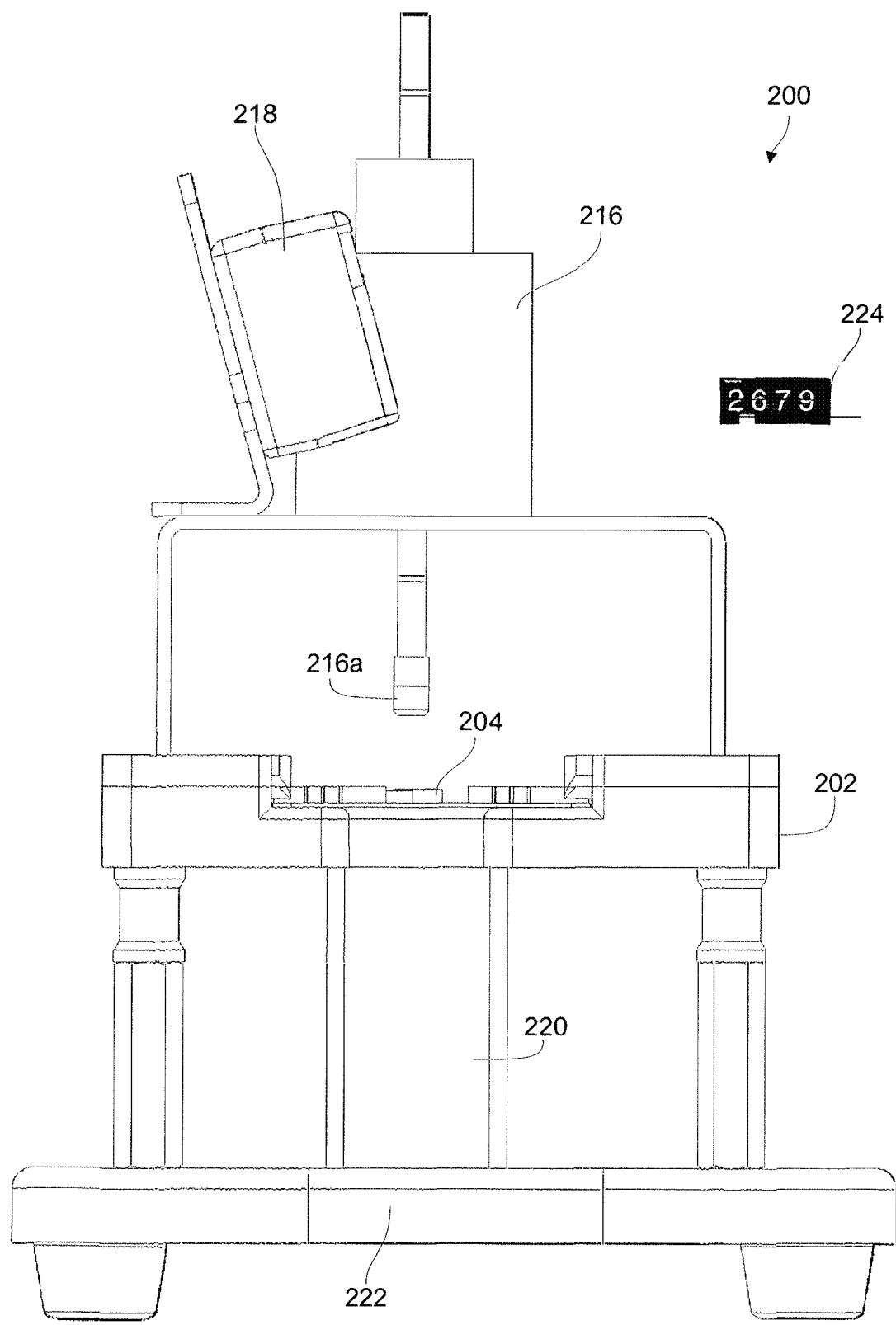
FIG. 7 depicts a puncher that is capable of mechanically separating a form changing part from a primary card body of a UICC and/or SIM card, according to embodiments of the present disclosure.

FIG. 7 depicts a puncher 200 that is capable of mechanically separating a form changing part from a primary card body of a UICC and/or SIM card, according to embodiments of the present disclosure. As shown in FIG. 7, the puncher 200 may include one or more of the punch housing 202, switch 204, a motor 216, such as a solenoid, having a punch head 216a, at least one imager 218, a chute and/or ramp 220, a tray 222, and a counter 224.

When a UICC and/or SIM card 100 is inserted into the guide opening 214a and the one or more notches 112 of the primary card body 102 align with the one or more projections 212 of the punch housing 202, which allows switch 204 to be pressed, a punching operation may proceed. In the punching operation, the switch 204 may send a signal to the motor 216 to punch a particular form changing part having an integrated circuit component 104 from the primary card body 102. Additionally, and/or alternatively, the switch 204 may send a signal to a computer attached to the puncher 200, which may instruct the motor 216 to operate.

The motor 216 may be a solenoid or any type of motor suitable for the punching operation of the particular form changing part having an integrated circuit component 104 from the primary card body 102. The motor 216 may include a punch head 216a that may push a particular form changing part having the integrated circuit component 104 from the primary card body 102. In an embodiment of the present disclosure, the motor 216 may be a motor that applies a force sufficient for punching the particular form changing part having an integrated circuit component 104 from the primary card body 102 without any damage. For example, the motor 216 may apply a force of approximately 1.5 Newtons. In embodiments of the present disclosure, the punching head 216a may changed according to which a size of the form changing part to be punched from the primary card body. Additionally, the form changing part aperture 206 may be changed to correspond to a size of the punch head 216a. For example, the punch head 216a having a size for a form changing part of a size 3FF may be selected such that a form changing part of a size 4FF may not separate, partially and/or in whole, from the form changing part of a size 3FF format when punched from the primary card body. Alternatively, the form changing part aperture 206 may be changed and a size of the punch head 216a may remain a constant size, such as a size for a 4FF form changing part. A benefit of using a single size punch head 216a is a cost to produce and maintain the puncher 200.

As shown in FIG. 7, the puncher 200 may include at least one imager 218. The at least one imager may be disposed above and/or below the punch housing 202. The at least one imager 218 may be one or more of an image reader, bar code reader, camera, etc., and enable the puncher 200 to read a bar code and/or other information, such as a serial number, on printed information sections 114 of the UICC and/or SIM card 100 (i.e., data carrier) having the integrated circuit component 104, the bar code and/or other information (serial number) including information about the integrated circuit component 104. The at least one imager 218 may be always on, activated when the switch 204 sends a signal to the at least one imager 218, and/or activated when a computer attached to the puncher 200 instructs the at least one imager 218 to operate. The at least one imager 218 may transmit information obtained from the printed information sections 114 of the UICC and/or SIM card 100 to a computer. For example, the at least one imager 218 may capture data from the printed information sections 114 on one or more surfaces 102a, 102b of the primary card body 102 including one or more of a SIM serial number, a SIM part number, a unique Integrated Circuit Card Identifier ("IC-CID"), International Mobile Subscriber Identity ("IMSI") number, and/or other security features that may be used to identify and authenticate subscribers and electronic communications devices on electronic communication networks.

The at least one imager 218 may then transmit the captured data, directly and/or via the computer, to a label printer (not shown) for use in pairing the form changing part having the integrated circuit component 104 with an electronic device. The at least one imager 218 may also be used to capture information from the electronic device into which the punched form changing part including the integrated circuit component, integrated circuit chip, and/or microprocessor may be inserted, and/or the at least one imager 218 may also be used to capture information from associated packaging material, information booklets, manuals, customer order data, etc.

Upon the punching operation, the particular form changing part having the integrated circuit component 104 may drop into the chute and/or ramp 220 and collect in the tray 222. Additionally, the counter 224 may track the number of punches, may increase by one after each punch, and/or may increase by a number of form changing parts being punched from the primary card body 102. The counter 224 may be operatively connected to the switch 204, and may track the number of punches. The counter 224 may also be used to track an operational lifespan of the motor 216 and/or punch head 216a so that one or both may be replaced before an unplanned failure may adversely affect production schedules.

Figure 8:
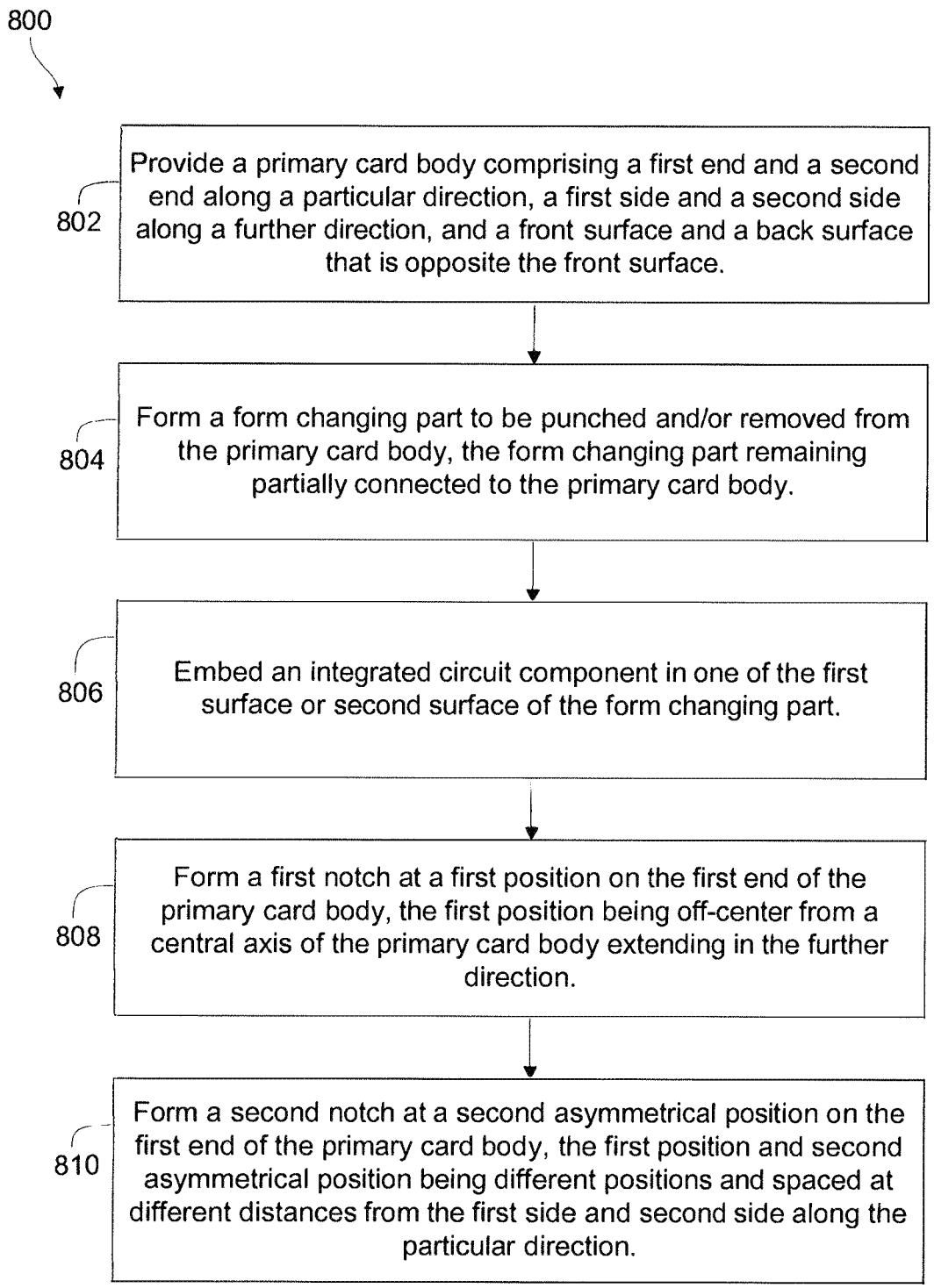
FIG. 8 depicts a flowchart of a method of forming a data carrier, such as UICC and/or SIM card, comprising a primary card body, according to embodiments of the present disclosure.

FIG. 8 depicts a flowchart of a method 800 of forming a data carrier, such as UICC and/or SIM card 100, comprising a primary card body, according to embodiments of the present disclosure. The method 800 may begin at step 802 in which a primary card body comprising a first end and a second end along a particular direction, a first side and a second side along a further direction, and a front surface and a back surface that is opposite the front surface may be provided. The method may then proceed to step 804, in which a form changing part to be punched and/or removed from the primary card body may be formed, the form changing part remaining partially connected to the primary card body. The form changing part may be formed by one or more of partially cutting out, milling, etching, stamping, and/or punching the form changing part, The form changing part may be connected to the primary card body by at least one fixing portion, and the form changing part may be removed and/or punched from the primary card body by breaking the at least one fixing portion. As described in more detail above, a size and/or a dimensional profile of the primary card body may be the ID-1 format, and a size and/or a dimensional profile of the form changing part may be one of a micro-SIM standard, a mini-SIM standard, and a nano-SIM standard.

Additionally, and/or alternatively, a plurality of form changing parts may be formed by one or more of partially cutting out, milling, etching, stamping, and/or punching the form changing part in the primary card body, each of the form changing parts remaining partially connected to the primary card body. Each of the form changing parts may be connected to the primary card body by at least one fixing portion, and each of the form changing parts may be removed and/or punched from the primary card body by breaking the respective at least one fixing portion. As described in more detail above, a dimensional profile of each form changing part may be one of a mini-SIM standard (2FF), a micro-SIM standard (3FF), and a nano-SIM standard (4FF), and each form changing part having a different dimensional profile.

The method may then proceed to step 806 where an integrated circuit component may be embedded in one of the first surface or second surface of the form changing part. The integrated circuit component may include an integrated circuit chip and/or a microprocessor having a plurality of electrical contacts. Alternatively, the integrated circuit component may be embedded in one of the first surface or second surface of the primary card body, and then a form changing part to be punched and/or removed from the primary card body may partially cut out, the form changing part remaining partially connected to the primary card body, and including the integrated circuit component.

At step 808, a first notch may be formed by cutting out, milling, etching, stamping, and/or punching the first notch at a first position on the first end of the primary card body, the first position being off-center from a central axis of the primary card body extending in the further direction. At step 810, a second notch may be formed by cutting out, milling, etching, stamping, and/or punching the second notch at a second asymmetrical position on the first end of the primary card body, the first position and second asymmetrical position being different positions and spaced at different distances from the first side and second side along the particular direction. Alternatively, the first and second notches may be formed and/or cut concurrently.

Figure 9:
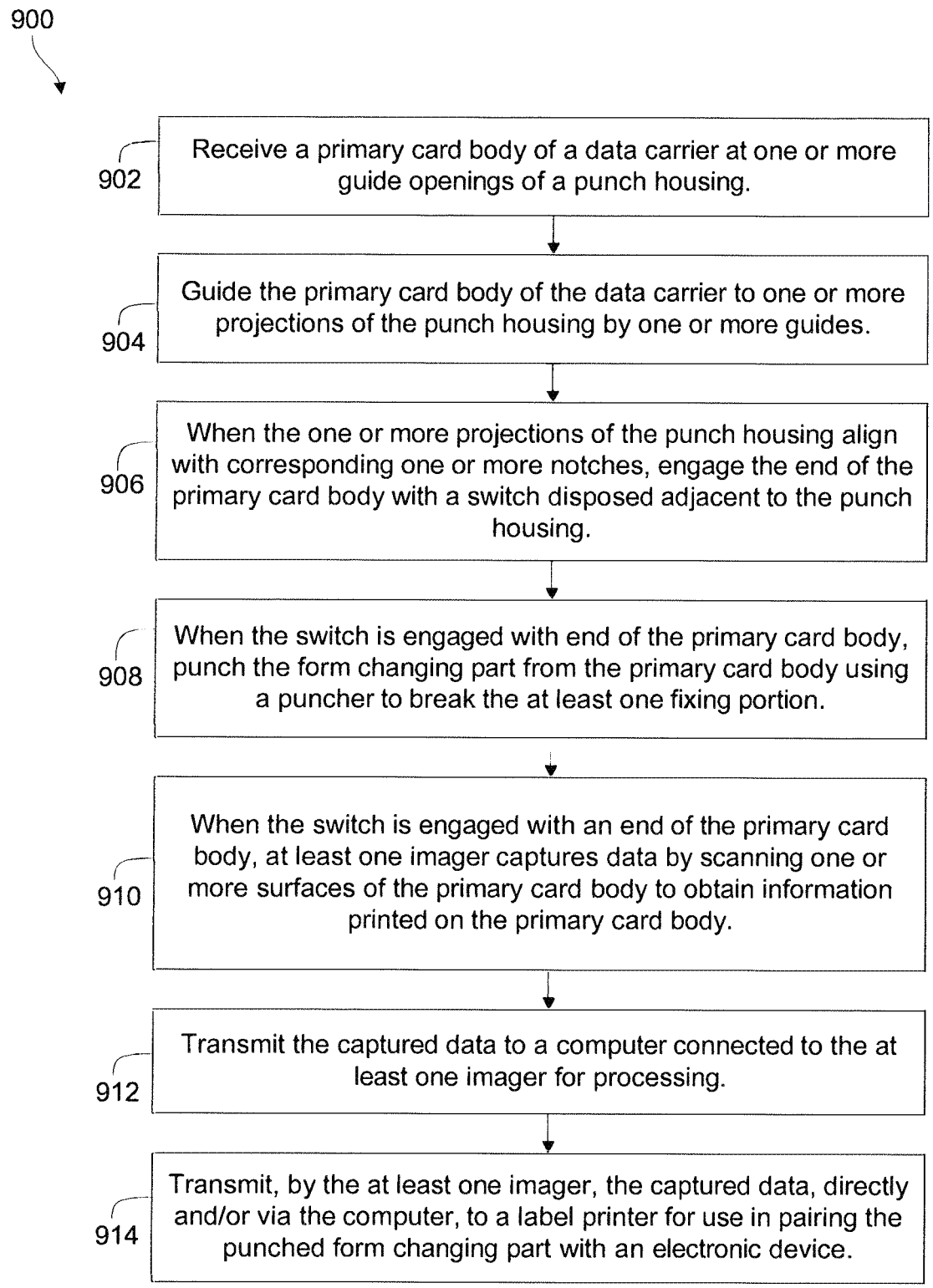
FIG. 9 depicts a flowchart of a method of removing a form changing part from a data carrier, such as UICC and/or SIM card, including a primary card body using a puncher, according to embodiments of the present disclosure.

FIG. 9 depicts a flowchart of a method 900 of removing a form changing part from a data carrier, such as UICC and/or SIM card 100, including a primary card body using a puncher, according to embodiments of the present disclosure. Method 900 may begin at step 902 where a primary card body of a data carrier is received at one or more guide openings of a punch housing. The primary card body may include at least one form changing part having an integrated circuit component embedded in one of a first surface or a second surface of the form changing part. The form changing part may be partially connected to the primary card body by at least one fixing portion, and the form changing part may be removed and/or punched from the primary card body by breaking the at least one fixing portion. An end of the primary card body may include one or more notches at an asymmetrical position.

The method then proceeds to step 904 in which the primary card body of the data carrier is guided to one or more projections of the punch housing by one or more guides. When the one or more projections of the punch housing align with corresponding one or more notches, engaging the end of the primary card body with a switch disposed adjacent to the punch housing at step 906. At step 908, when the switch is engaged with end of the primary card body, the form changing part may be punched from the primary card body using a puncher to break the at least one fixing portion. At step 910, when the switch is engaged with end of the primary card body, at least one imager may capture data by scanning one or more surfaces of the primary card body to obtain information printed on the primary card body. At step 912, the captured data may be transmitted to a computer connected to the at least one imager for processing. Alternatively, and/or additionally, the at least one imager may be always on and/or activated when a computer attached to the puncher instructs the at least one imager to operate. The captured data may include one or more of a SIM serial number, a SIM part number, a unique Integrated Circuit Card Identifier ("ICCID"), International Mobile Subscriber Identity ("IMSI") number, and/or other security features that may be used to identify and authenticate subscribers and electronic communications devices on electronic communication networks.

At step 914, the at least one imager may then transmit the captured data, directly and/or via the computer, to a label printer for use in pairing the punched form changing part having the integrated circuit component with an electronic device.

Figure 10:
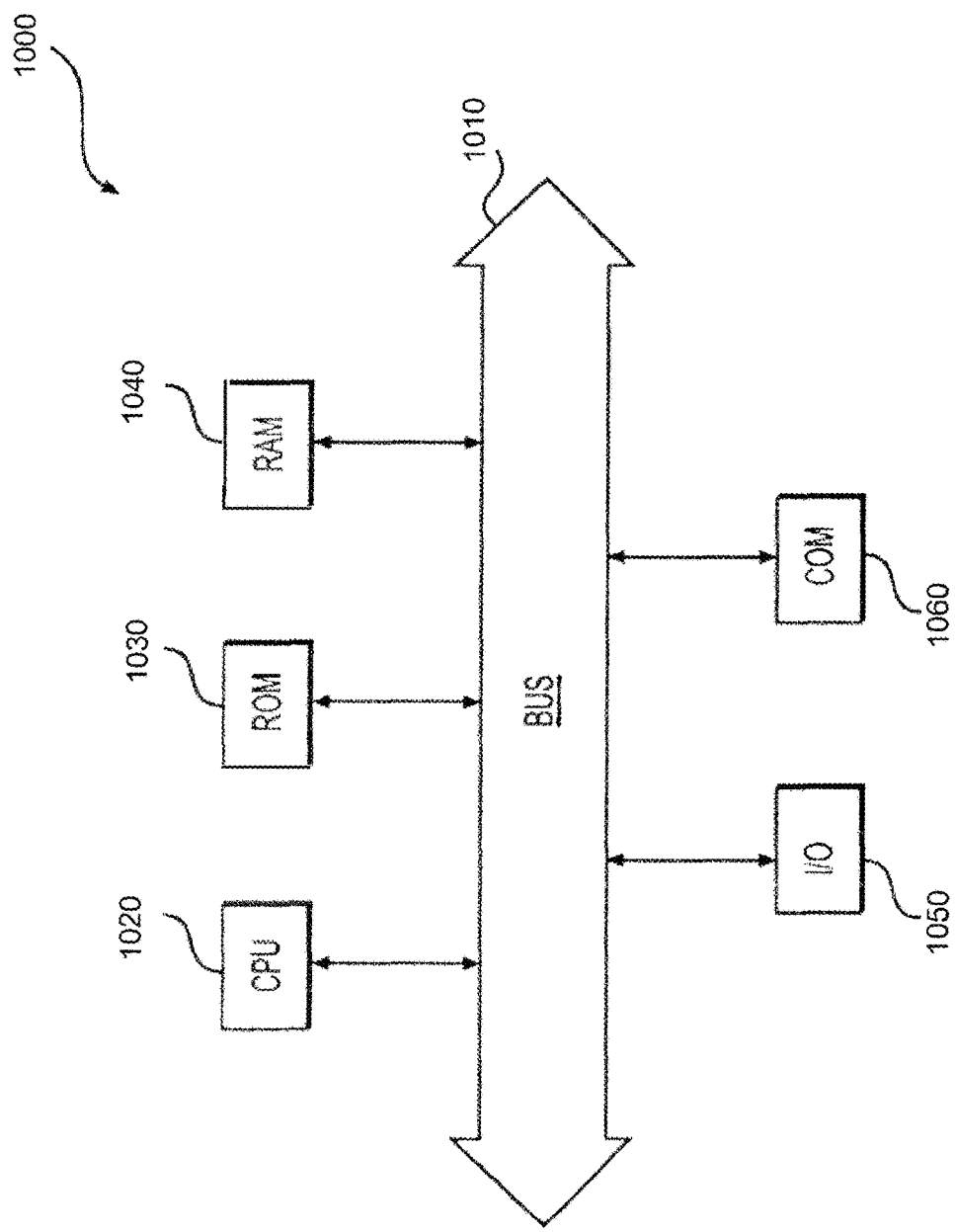
FIG. 10 is a simplified functional block diagram of a computer that may be configured as devices, systems, and/or servers in executing at least part of the methods of FIGS. 8 and 9, according to exemplary embodiments of the present disclosure.

FIG. 10 is a simplified functional block diagram of a computer that may be configured as devices, systems, and/or servers in executing and/or assisting in at least part of the steps of the methods of FIGS. 8 and 9, according to exemplary embodiments of the present disclosure. Specifically, in one embodiment, any of the devices, systems, and/or servers may be an assembly of hardware 1000 including, for example, a data communication interface 1060 for packet data communication. The platform may also include a central processing unit ("CPU") 1020, in the form of one or more processors, for executing program instructions. The platform includes an internal communication bus 1010, program storage, and data storage for various data files to be processed and/or communicated by the platform, such as ROM 1030 and RAM 1040, although the system 1000 receives programming and data via network communications 1060. The server 1000 also may include input and output ports 1050 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device.

Other embodiments of the disclosure will be apparent to those skilled in the art from consideration of the specification and practice of the disclosure provided herein. It is intended that the specification and examples be considered as exemplary only, with a true scope and spirit of the present disclosure being indicated by the following claims. While the present disclosure has been described in connection with various example structures, configurations, and illustrative implementations, it will be understood by those skilled in the art that other variations and modifications of the structures, configurations, and implementations described above may be made without departing from the scope of the present disclosure. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the claims will be apparent to those skilled in the art from a consideration of the specification or practice of the present disclosure.

What is claimed is:

1. A data carrier puncher for removing detachable parts of data carriers, the data carrier puncher comprising:
   a punch housing that receives a data carrier with at least one detachable part, the punch housing including:
      a form changing part aperture that corresponds to a size of a particular detachable part configured to be removed from the data carrier, the form changing part aperture configured to permit the particular detachable part to pass therethrough; and
      one or more projections be disposed off-center from a central axis of the punch housing, the one or more projections corresponding to one or more notches on an edge of a primary card body of the data carrier;
   a switch disposed adjacent to the one or more projections, the switch, when activated, causing removal of the detachable part from the data carrier; and
   a punch operably connected to the switch, when activated by the switch, the punch breaking at least one fixing portion connecting the detachable part to the data carrier in response to activation of the switch,
   wherein the one or more projections are configured to permit the data carrier to engage the switch to prevent improper activation of the switch and damage to an integrated circuit component of the at least one detachable part.

2. The data carrier puncher according to claim 1, wherein the form changing part aperture is disposed on a punch template, wherein the punch template is exchangeable, and wherein each exchangeable punch template having a corresponding form changing part aperture that has a size that corresponds to respective form changing part sizes.

3. The data carrier puncher according to claim 1, wherein the form changing part aperture is adjustable in size, the adjustable size of the form changing part aperture corresponding to the size of the particular detachable part configured to be removed from the data carrier.

4. The data carrier puncher according to claim 1, wherein the punch housing further comprises a second aperture configured to make printed information sections of the data carrier accessible for reading by an imager disposed below the punch housing.

5. The data carrier puncher according to claim 1, wherein the punch includes a punch head configured to break the at least one fixing portion connecting the detachable part to the data carrier in response to activation of the switch.

6. The data carrier puncher according to claim 5, wherein the punch head is operably connected to a motor that pushes the punch head when activated by the switch.

7. The data carrier puncher according to claim 1, wherein the punch housing further comprises one or more guides configured to assist in an insertion of the primary card body of the data carrier into the punch housing.

8. The data carrier puncher according to claim 7, wherein the one or more guides are further configured to hold of the primary card body of the data carrier when the particular detachable part is punched from the primary card body.

9. The data carrier puncher according to claim 7, wherein each guide of the one or more guides has a respective guide opening, the guide opening being one or both of curved and angular, and the guide opening is configured to assist in the insertion of the primary card body of the data carrier.

10. The data carrier puncher according to claim 1, further comprising:
   at least one imager configured to capture printed information sections on a surface of the data carrier.

11. The data carrier puncher according to claim 10, wherein the at least one imager is disposed one or both of above and below the punch housing.

12. The data carrier puncher according to claim 11, further comprising:
   a tray configured to collect a plurality of detachable parts removed from a corresponding plurality of data carriers.

13. The data carrier puncher according to claim 12, further comprising:
   a chute configured to guide a detachable part removed from a data carrier that has passed through the form changing part aperture to the tray.

14. The data carrier puncher according to claim 10, wherein the at least one imager is one or more of an image reader, a bar code reader, and a camera.

15. The data carrier puncher according to claim 10, wherein each imager of the at least one imager is one of: always on, activated when the switch sends a signal to the at least one imager, and activated when a computer attached to the puncher instructs the at least one imager to operate.

16. The data carrier puncher according to claim 10, wherein the at least one imager transmits the captured printed information sections to a computer.

17. The data carrier puncher according to claim 1, further comprising:
   a first imager configured to capture printed information sections on a surface of the data carrier, and
   a second imager configured to capture information from an electronic device into which a punched detachable part is to be inserted.

18. The data carrier puncher according to claim 1, further comprising:
   a counter operatively connected to the switch and configured to track a number of punches.

19. A method of removing a form changing part from a data carrier using a puncher, the method comprising:
   receiving a data carrier at one or more guide openings of a punch housing, the data carrier including:
      a primary card body having a first size, the primary card body including a first end and a second end along a particular direction, a first side and a second side along a further direction, and a front surface and a back surface that is opposite the front surface;
      a form changing part disposed within the primary card body and having a second size, the form changing part connected to the primary card body by at least one fixing portion, and the form changing part configured to be removed from the primary card body by breaking the at least one fixing portion;
      an integrated circuit component embedded in the form changing part within the primary card body; and
      at least one notch disposed at a first position on the first end of the primary card body, the first position being off-center from a central axis of the primary card body extending in the further direction;
   guiding the primary card body of the data carrier to align the at least one notch to corresponding one or more projections of the punch housing by one or more guides;
   engaging, when the one or more projections of the punch housing align with a corresponding at least one notch, the first end of the primary card body with a switch disposed adjacent to the punch housing; and punching, when the primary card body engages the switch, the form changing part from the primary card body using a puncher to break the at least one fixing portion.

20. The method according to claim 19, further comprising:

capturing, when the primary card body engages the switch, data encoded on the primary card body by scanning one or more surfaces of the primary card body by at least one imager to obtain information printed on the primary card body;

transmitting the captured data to a computer connected to the at least one imager for processing, the captured data corresponding to the data encoded on the primary card body.

21. The method according to claim 20, further comprising:

transmitting, by the at least one imager, the captured data, directly and/or via the computer, to a label printer for use in pairing the punched form changing part having the integrated circuit component with an electronic device.

* * * * *